US007432941B2

(12) United States Patent
Parent et al.

(10) Patent No.: US 7,432,941 B2
(45) Date of Patent: *Oct. 7, 2008

(54) DETERMINING DISPLAY SUBSYSTEM COMPLIANCE

(75) Inventors: Gershon Parent, Seattle, WA (US); Shanon I Drone, Redmond, WA (US); Jeffrey Scott Norris, Woodinville, WA (US); Michael David Anderson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

This patent is subject to a terminal disclaimer.

(21) Appl. No.: 11/213,264

(22) Filed: Aug. 26, 2005

(65) Prior Publication Data

US 2005/0280663 A1 Dec. 22, 2005

Related U.S. Application Data

(63) Continuation of application No. 10/351,860, filed on Jan. 24, 2003, now Pat. No. 7,057,630.

(51) Int. Cl.
*G09G 5/02* (2006.01)
*G06F 19/00* (2006.01)

(52) U.S. Cl. ........................ 345/698; 345/604; 702/108

(58) Field of Classification Search ................. 345/154, 345/156, 604, 667, 698; 702/108; 382/112, 382/141, 145
See application file for complete search history.

(56) References Cited

U.S. PATENT DOCUMENTS 4,464,655 A * 8/1984 Bird ........................... 345/618
5,172,103 A 12/1992 Kita
5,271,096 A 12/1993 Cook
5,309,376 A * 5/1994 Barraco et al. .............. 702/108
5,579,031 A 11/1996 Liang
6,163,619 A 12/2000 Maruo
6,388,654 B1 5/2002 Platzker et al.
6,658,139 B1 12/2003 Cookingham et al.
6,744,913 B1 6/2004 Guest et al.
7,057,630 B2 * 6/2006 Parent et al. ................ 345/698

OTHER PUBLICATIONS

"3DMark03 Pro Tests," *Futuremark Corporation*, n.d., <http://www.futuremark.com/products/3dmark03/?tests> [retrieved Apr. 25, 2003].

(Continued)

*Primary Examiner*—Sumati Lefkowitz
*Assistant Examiner*—Srilakshmi K Kumar
(74) *Attorney, Agent, or Firm*—Shook Hardy & Bacon L.L.P.

(57) ABSTRACT

A system and method for determining whether a target display subsystem is compliant with a reference display subsystem is provided. A target display subsystem is selected for outputting image data. Drawing instructions are generated and applied to the target display subsystem. Image data generated by the target display subsystem, responsive to the applied drawing instructions, is periodically captured and recorded. The reference subsystem is selected, and the same drawing instructions are applied to the reference display subsystem. Image data generated by the reference display subsystem is periodically captured and recorded from the reference display subsystem. Thereafter, the captured image data from the target display subsystem and the reference display subsystem are compared to determine whether the target display subsystem is compliant with the reference display subsystem.

20 Claims, 9 Drawing Sheets

OTHER PUBLICATIONS

"3DMark2001 Second Edition," *Futuremark Corporation*, n.d., <http://www.futuremark.com/products/3dmark2001/> [retrieved Jan. 10, 2003].

Dhagat, M., "3DMark03: Next Generation 3D Benchmarking (White Paper)" [online], *Futuremark Corporation*, Feb. 11, 2003, <http://www.futuremark.com/companyinfo/3dmark03_whitepaper.pdf>.

"FRAPS—Measure Framerates in DirectX and OpenGL!" *Fraps.com* <http://www.fraps.com/> [retrieved Oct. 18, 2002].

"FRAPS—Frequently Asked Questions," *Fraps.com* <http://www.fraps.com/faq.htm> [retrieved Oct. 18, 2002].

Salvator, D., "Exclusive! 3D GameGauge 3.0 Debuts," *ExtremeTech*, May 10, 2002, <http://www.extremetech.com/print_article/0,3998,a=26804,00.asp> [retrieved Oct. 18, 2002].

* cited by examiner

DETERMINING DISPLAY SUBSYSTEM COMPLIANCE

CROSS-REFERENCE TO RELATED APPLICATION

This application is a continuation of U.S. patent application Ser. No. 10/351,860, filed Jan. 24, 2003.

BACKGROUND

Ensuring application compatibility with a multitude of graphic display subsystem is an extremely important, yet tedious and labor intensive, challenge. It is made even more challenging due to the ever-changing nature of both application software and graphic display subsystems. The importance of application compatibility arises from the fact that a significant amount of catastrophic run-time failures is caused by display instability and, in particular, display subsystem instability.

One way in which application compatibility is achieved is by ensuring that the output generated by a target display subsystem is comparable to the output generated by an established, reference display subsystem for the same set of drawing instructions. When a target display subsystem's generated output is sufficiently comparable to a reference display subsystem's generated output, the target display subsystem is said to be compliant with the reference display subsystem.

Microsoft's Windows Hardware Quality Lab (WHQL) program has been successful in ensuring a base level of compliance among certified graphic display subsystems. Display subsystem providers submit their subsystems (typically including a graphics display interface and an associated display driver) to the WHQL where they are tested to determine whether the output generated by a submitted display subsystem is comparable to the output generated by a reference display subsystem. When a submitted display subsystem's output meets or exceeds a certain level of comparability, that subsystem receives a WHQL certification. A software developer may reasonably expect and rely upon the fact that a display subsystem certified by the WHQL will behave in a relatively consistent and predictable manner, at least at a base level. However, the WHQL certification process is cumbersome and labor intensive, including certain visual inspections to determine whether a graphic display system is compliant with the requisite standards for certification.

Additionally, display subsystem providers are constantly creating new subsystems that are more powerful, sophisticated, and complex. These sophisticated and complex operations are designed to enable software application developers to improve their products. However, due to these subsystems' more complex nature, they increasingly become more difficult and time consuming to fully test for compliance using current methods. Even then, certification ensures only a basic level of compliance.

Because some of the more sophisticated and complex operations are beyond the basic level of certification, they may be viewed as unreliable by software developers. Consequently, instead of taking full advantage of these new operations and abilities, software developers typically opt for one of the following: (1) "dumb down" their application; or (2) add hardware-specific code into their application to deal with problem areas associated with a particular display subsystem. "Dumbing down" an application means that a software developer foregoes using the more sophisticated and powerful, but potentially unreliable, operations. This, of course, also means that the application may not perform at the level the software developer intended, or at least at a loss of performance. Alternatively, adding hardware-specific code creates difficulties for software developers because such code must be updated in order to be kept current with new display subsystems. Further, hardware-specific code cannot be easily adapted when a display subsystem provider makes changes to correct subsystem reliability issues. This has the same effect as "dumbing down" the code. Still further, hardware-specific code leads to code bloat: an increase in the code size, usually accompanied with a commensurate performance loss.

What is needed is a way to ensure a higher level of reliability of display subsystems among a variety of software applications. Additionally, the compliance certification process should be more automated, eliminating the labor-intensive nature of the process, as well as subjective visual inspections.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computer system for determining if a target display subsystem is compliant with a reference display subsystem is presented. The computer system comprises a reference display subsystem. The reference display subsystem is operative, within the computer system, for receiving drawing instructions and generating image data suitable for display on a display device. The computer system also comprises a target display subsystem. The target display subsystem is operative, within the computer system, for receiving drawings instructions and generating image data suitable for display on an output device. The computer system further comprises a compliance test subsystem. The compliance test subsystem is configured to perform the following: (i) generate drawing instructions; (ii) apply said drawing instructions to one of said reference display subsystem and said target display subsystem; (iii) store image data generated by said one of said reference display subsystem and said target display subsystem resulting from the application of said drawing instructions to said one of said reference display subsystem and said target display subsystem; (iv) apply said drawing instructions to the other of said reference display subsystem and said target display subsystem; (v) store image data generated by the other of said reference display subsystem and said target display subsystem resulting from the application of said image data to the other of said reference display subsystem and said target display subsystem; and (vi) compare said stored image data generated by said reference display subsystem and said target display subsystem to determine if said target display subsystem is compliant with said reference display subsystem.

A computer-implemented method for determining whether a target display subsystem is compliant with a reference display subsystem is also presented. The method comprising each of the following performed by a computer. A first display subsystem operative on the computer for generating image data suitable for display on a display device is selected, the first display subsystem being either a target display subsystem or a reference display subsystem. Drawing instructions are generated a first time and the drawing instructions are applied to the first display subsystem. Image data generated by the first display subsystem in response to the applied drawing instructions is captured and recorded. A second display subsystem operative on the computer for generating image data for display on a display device is selected, the second display subsystem being either the target display subsystem or the reference display subsystem that was not selected as the first display subsystem. Image data generated a second time by the second display subsystem in response to the applied drawing instructions is captured and recorded. The captured and recorded image data generated by the first display subsystem is compared with the captured and recorded image data generated by the second display subsystem to determine if the target display subsystem is compliant with the reference display subsystem.

A tangible computer-readable medium having computer-executable instructions is presented. When executed on a computer, the computer-executable instructions carry out the method comprising each of the following. A first display subsystem operative on the computer for generating image data suitable for display on a display device is selected, the first display subsystem being either a target display subsystem or a reference display subsystem. Drawing instructions are generated a first time and the drawing instructions are applied to the first display subsystem. Image data generated by the first display subsystem in response to the applied drawing instructions is captured and recorded. A second display subsystem operative on the computer for generating image data for display on a display device is selected, the second display subsystem being either the target display subsystem or the reference display subsystem that was not selected as the first display subsystem. Image data generated a second time by the second display subsystem in response to the applied drawing instructions is captured and recorded. The captured and recorded image data generated by the first display subsystem is compared with the captured and recorded image data generated by the second display subsystem to determine if the target display subsystem is compliant with the reference display subsystem.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
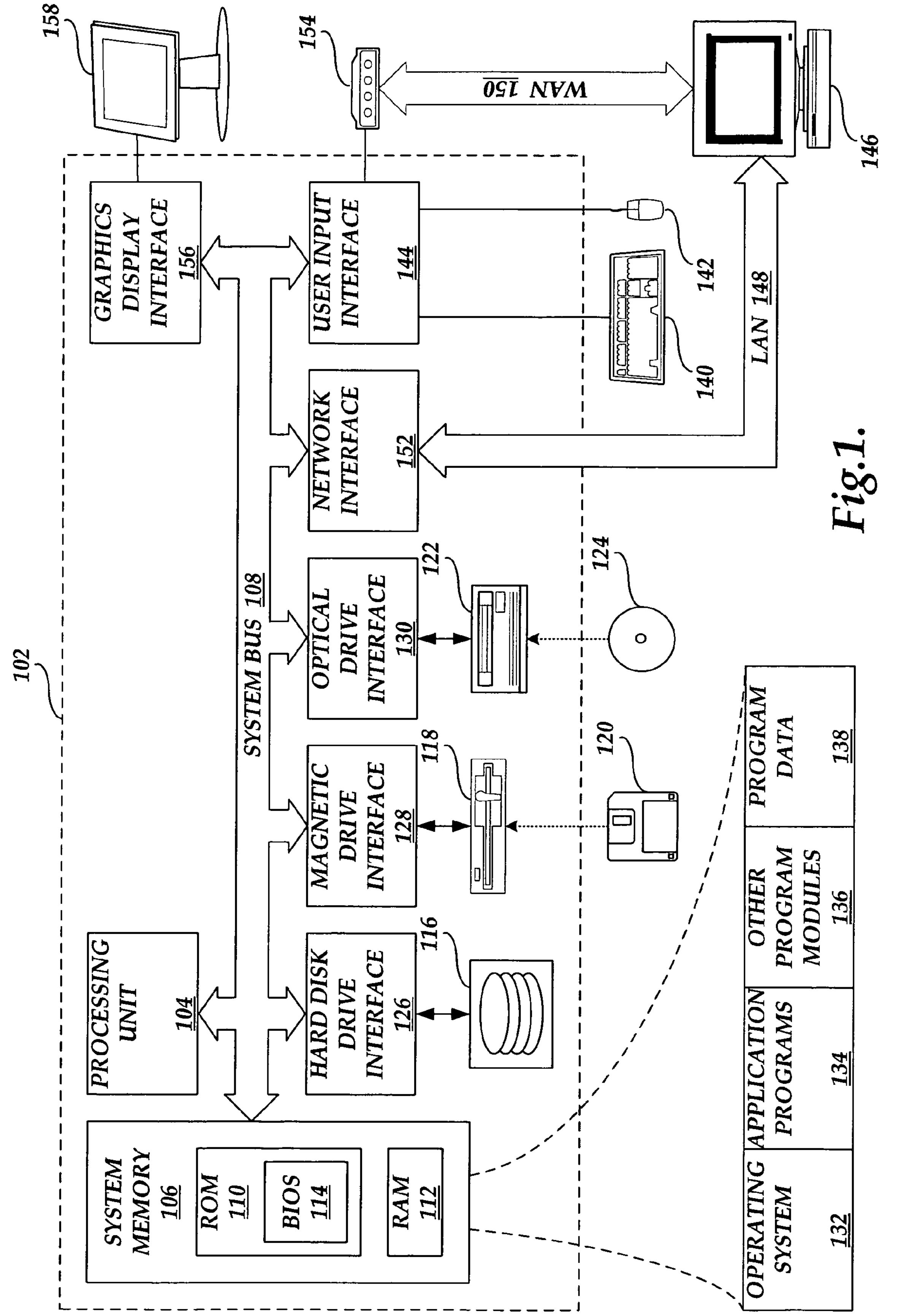
FIG. 1 is a block diagram of a computer system suitable for providing an exemplary operating environment for the present invention.

FIG. 1 and the following discussion are intended to provide a brief, general description of a computing system suitable for implementing various features of the invention. While the computing system will be described in the general context of a personal computer usable in a distributed computing environment, where complimentary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices. Additionally, while aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read only memory (ROM) 110 and random access memory (RAM) 112. A basic input/output system 114 (BIOS), containing the basic routines that help to transfer information between elements within the personal computer 102, such as during start-up, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. In addition, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used.

Figure 2:
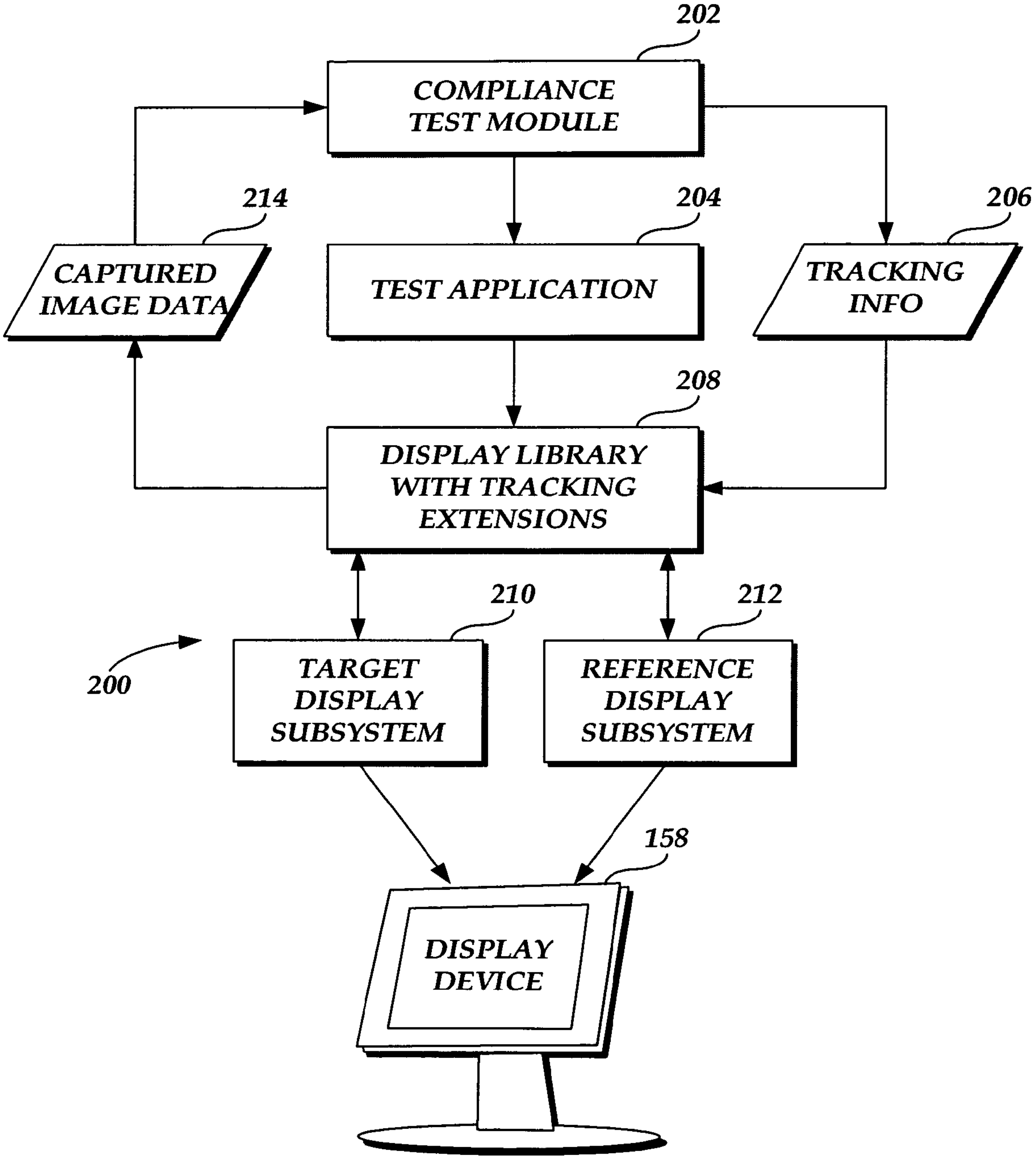
FIG. 2 is a block diagram illustrating an exemplary compliance test system formed in accordance with the present invention.

FIG. 2 is a block diagram illustrating an exemplary compliance test system 200 formed in accordance with the present invention. The system 200 includes a compliance test module 202 that both initiates and completes the compliance test process. The compliance test module 202 initiates the process by launching a test application 204 twice, once to send image data through a target display subsystem 210 to the display device 158 (FIG. 1) and capture and record the image data generated by the target display subsystem, and once to send image data through a reference display subsystem 212 to the display device and capture and record image data output by the reference display subsystem. Thereafter, the compliance test module 202 completes the compliance test process by comparing captured image data 214 generated by the two display subsystems and recorded by a display library 208.

According to another aspect of the invention (not shown), the compliance test module 202 may launch multiple test applications in order to determine whether the target display subsystem 210 is compliant with the reference display subsystem 212. By utilizing multiple test applications, the system 200 is typically able to exercise more features of a display subsystem because the multiple test applications will typically exercise distinct features, and distinct combinations of features, of a display subsystem. Additionally, where a test application is provided by a software developer and is representative of a commercially available software application from that developer, display subsystem providers could potentially certify that their display subsystem is compliant with that particular software application, provided the display subsystem proves to be compliant according the present invention. Alternatively (not shown), the compliance test module 202 may itself provide the drawing instructions used to test whether the target display subsystem 210 is compliant with the reference display subsystem 212.

In order for the invention to properly function, the test application 204 (or test applications) should be deterministic in its execution and in its output, or alternatively, be capable of deterministic behavior and output. This means that while testing the compliance of a target display subsystem, the test application 204, or multiple test applications, must execute the same instructions from start to finish and generate the same display instructions for the display library 208 during its execution each time the test application is launched and executed. Alternatively, the test application 204 could exhibit some random behavior provided that (1) the randomness may be filtered out either before image data is captured or during comparison of the image data such that it is not considered in the comparison, and (2) the randomness does not otherwise affect the image data that is to be compared. In order to execute in a deterministic manner, the test application 204 may execute according to instructions in an associated script file or, alternatively, the test application 204 may be specially encoded to execute in a predetermined manner, such as a specially coded demo/test application. Those skilled in the art will recognize that there are other ways of ensuring deterministic operation. Accordingly, the described alternatives are provided for illustration and should not be construed as limiting the present invention as defined by the appended claims.

In order to achieve a high degree of confidence that the target display subsystem 210 is compliant with the reference display subsystem 212, the test application 204, or test applications, should be selected for its ability to exercise a substantial portion of the capabilities of the target display subsystem, and also to combine those capabilities in complex manners. Additionally, because the target display subsystem 210 is ultimately intended to be used in "real world" situations, according to one aspect of the invention, the test application 204, or test applications, is a third party application. One key aspect of a third party application is that there is no access to the programming code used to generate the third party application, only the executable. By selecting a third party application as the test application 204, or by using a suite of test applications including third party applications, determining whether the target display subsystem 210 is sufficiently compliant with the reference display subsystem 212 adds a "real world" sense.

During the course of execution, the test application 204 will generate display information directed to the display device 158. For the test application 204, this display information is sent to the display device 158 via the display library 208. Examples of currently existing display libraries include DirectX® and OpenGL®. Display libraries provide a layer of abstraction between test applications and the display subsystems. Through the display library 208, software applications can generate output for display on a display device 158 according to a predefined, abstract collection of display instructions. This layer of abstraction relieves the software application developer from writing to specific display subsystems or supporting multiple display subsystems in the same application.

After receiving display information from the test application 204, the display library 208 converts the output from the test application into data and instructions directed to a particular display subsystem, such as the target display subsystem 210 or the reference display subsystem 212. The display subsystem then performs any necessary conversion of the instructions and data received for the software application via the display library 208 and forwards that information, referred to herein as image data, to the display device 158.

According to the present invention, while the display library 208 operates as a typical display library in regard to the test application 204, the display library is enhanced with tracking extensions that enable it to track and record image data with the captured image data 214 as the image data is generated by the selected display subsystem. Accordingly, one extension to the display library 208 is the ability to select a display subsystem for sending output to the display device. The display library 208 selects between the target display subsystem 210 and the reference display subsystem 212 according to tracking information 206 generated by the compliance test module 202.

According to the present invention, the reference display subsystem 212 is the standard against which all other display subsystems, such as the target display subsystem 210, are to be compared to determine compliance. However, this standard applies only to display output, not to speed or performance issues. According to one aspect of the present invention, the reference display subsystem 212 receives display instructions and data from the display library 208 and generates frames of rasters to represent the information and data when displayed. Those skilled in the art will recognize that a raster represents a line of pixels (picture elements) for display on a display device 158. Frames of rasters are a basic collection of data that can be readily compared at a later time. However, while one embodiment of the present invention compares frame of rasters to determine compliance, the present invention should not be construed as limited to comparing only raster information. In alternative embodiments, the reference display subsystem 212 may generate image data in other formats, such as vector data. Other formats are equally usable for testing compliance so long as the output image data from the reference display subsystem 212 may be properly compared to the output image data from the target reference display subsystem 210.

In order to determine compliance between a target display subsystem 210 and a reference display subsystem 212, the compliance test module 202 executes the test application 204 two times. Prior to launching/executing the software application 204, the compliance test module 202 initializes the tracking information 206 with information including a selected display subsystem indicator that the display library 208 will use to select a display subsystem for outputting display information to the display device 158. For example, prior to the first launch/execution of the test application 204, the compliance test module 202 will write information in the tracking information 206 indicating that the target display subsystem 210 is to be selected. Additionally, the tracking information 206 may also indicate the frequency with which the display library 208 is to capture and record image data from the selected display subsystem.

During execution of the test application 204, the display library 208 will be tracking image data generated by the selected display subsystem and capturing some of the generated image data. According to one aspect of the invention, frames of image data are captured according to predetermined intervals. For example, the predetermined intervals may include values indicating that frames 3, 7, 253, 600, and 1547 are to be captured and recorded from both the target display subsystem 210 and the reference display subsystem 212. According to one embodiment, these predetermined intervals are be provided to the display library 208 by the compliance test module 202 via the tracking information 206. The predetermined intervals may be manually determined and provided to the compliance test module 202, or alternatively, may be randomly generated, either by the compliance test module or the display library 208. It is important, however, that the interval values of the frames of image data captured from the target display subsystem 210 correspond to the interval values of the frames of image data captured from the reference display subsystem 212 in order to properly determine whether the target display subsystem is compliant with the reference display subsystem.

According to yet another aspect of the present invention, the predetermined intervals are established according to a frequency value. A frequency value identifies a constant period between interval values to the display library 208, thereby indicating which of every frame of image data sent to the display device 158 the display library should capture. For instance, if the frequency value is seven, the display library will capture every seventh frame of image data sent by the selected display subsystem to the display device 158.

While certain alternatives for determining which frames of image data to capture are described above, they are illustrative and should not be construed as limiting on the present invention. One skilled in the art will readily recognize that there are other alternatives for establishing predetermined intervals for capturing image data from the selected display subsystems. These alternatives are contemplated as falling within the scope of the present invention.

After the test application 204 executes and terminates for the first time, the compliance test module 202 reinitializes the tracking information 206, directing the display library 208 to select the display subsystem not previously used in the first execution. For instance, if the target display subsystem 210 is selected for the first execution of the test application 204, the tracking information 206 will indicate that the reference display subsystem 212 should be selected for the subsequent execution of the test application. The compliance test module 202 then launches/executes the test application 204 for the second time. However, during the reinitialization of the tracking information 206, the predetermined intervals should not be changed. Changing the predetermined intervals between the first and second executions of the test application 204 will potentially lead to erroneous comparison results.

According to one aspect of the present invention, because the compliance test module 202 may be operating at a different operating system level than the display library 208, the tracking information 206 is written to a specific shared memory location. Alternatively, the tracking information 206 may be written in a data file shared by both the compliance test module 202 and the display library 208. However, these alternatives are for illustration purposes and should not be construed as limiting the present invention. Those skilled in the art will recognize that there are other ways for the compliance test module 202 to communicate the tracking information 206 to the display library 208 besides those previously described that lie within the scope of the present invention as defined by the appended claims.

After the test application 204 has finished executing for a second time, the captured image data 214 from both executions will be retrieved by the compliance test module 202 and compared in order to determine whether the target display subsystem 210 is compliant with the reference display subsystem 212. It should be understood that while the description of FIG. 2 has described the target display subsystem 210 as selected first, this sequence is for illustration purposes only and should not be construed as limiting the present invention. Those skilled in the art will recognize that the specific order of selection, i.e., whether the target display subsystem is selected for the first or second execution of the test application 204, is not important to the present invention.

According to yet another aspect of the present invention, it is not necessary that the image data generated by the reference display subsystem 212 actually reach the graphics display device 158. As already mentioned, the present invention determines compliance according to the image data in the captured image data 214. Thus, whether any or all of the image data generated by the reference display subsystem 212 actually reach the display device 158 does not affect the comparison of captured image data. Accordingly, drawing instructions that result would result in image data not captured by the display library 208 need not be converted/generated into actual image data at all by the reference display subsystem 212. The reference display subsystem 212 may properly ignore drawing instructions that will not be captured and recorded for later comparison, provided that the skipped instructions do not have any effect on the captured frames. Generating only that image data that will be captured by the display library 208 substantially improves the overall performance of the entire system 200.

The captured image data 214 includes image data generated by both the target and reference display subsystems, captured and recorded by the display library 208 at the predetermined intervals. The captured image data 214 includes two general segments, one for image data captured from the target display subsystem 210 and a second for image data captured from the reference display subsystem 212. Smaller segmentation within the two general segments is also possible. For instance, each segment may comprise frames of rasters. As already mentioned, image data captured from both display subsystems should be in a compatible format to facilitate the comparison between the two. Accordingly, while the image data may be captured by frames of raster data, the image data is not required to be in rasterized format.

It should be understood that FIG. 2 sets forth logical components of the compliance test system 200. Those skilled in the art will recognize that in actual embodiments, the functions of one or more logical components identified in FIG. 2 may be distributed among several actual components. Additionally, several illustrated components may be combined into a single actual component. Other additional components may also be present in actual embodiments. Accordingly, the particular configuration of components and associated functions illustrated in FIG. 2 should not be construed as limiting the present invention.

Figure 3:
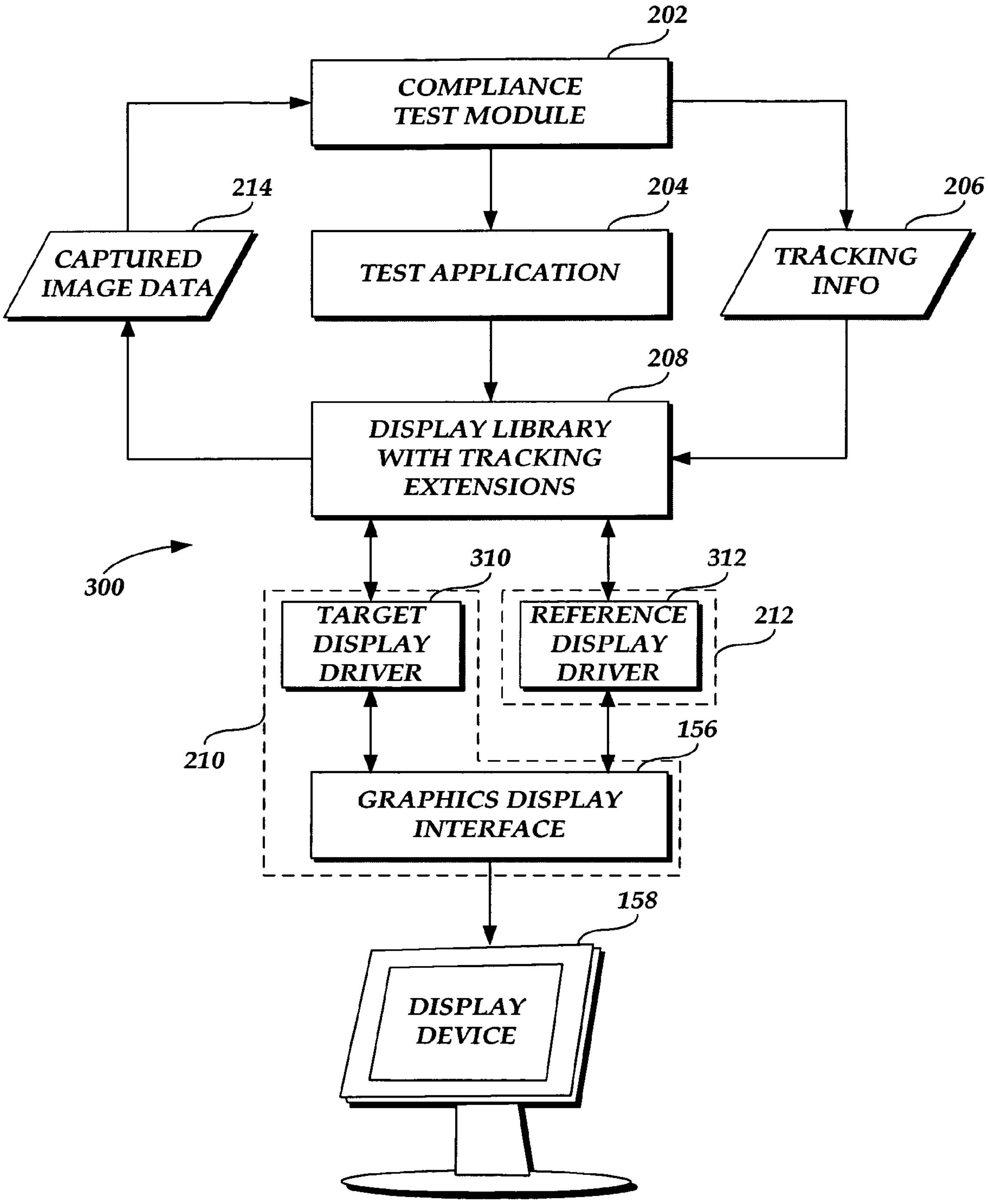
FIG. 3 is a block diagram illustrating one particular embodiment of an exemplary compliance test system formed in accordance with the present invention.

FIG. 3 is a block diagram illustrating an alternative embodiment of an exemplary compliance test system 300 formed in accordance with the present invention. According to this alternative embodiment, the display subsystems include a graphics display interface 156 (FIG. 1) and a display driver, such as the target display driver 310 or the reference display driver 312, in place of the target display subsystem 210 and the reference display subsystem 212. A display driver is a software interface between a display library and a hardware graphics display interface. Display drivers are typically provided by a graphics display interface provider and are sold as a graphics display system. Accordingly, when a system is configured with a display driver, virtually all information that goes to the graphics display interface 156 must pass through the associated display driver.

According to the illustrative diagram of FIG. 3, the target display driver 310 and the graphics display interface 156 comprise the target graphic display subsystem 210. FIG. 3 illustrates that the reference display driver 312 communicates with the graphics display interface 156 for sending image data to the display device 158. Alternatively (not shown), in many instances, the reference display driver will communicate with the graphics display interface 156 through the target display driver 310. However, under such circumstances, the image data sent by the reference display driver 312 to the target display driver 310 is very basic in nature, such as image rasters or frames of image rasters, and an assumption is made and relied upon that the target display driver's 310 raster transfer function is operating correctly.

According to the illustrative embodiment 300, when the target display subsystem 210 is selected, as described above in regard to FIG. 2, the display library 208 sends display information and data to the target display driver 310. The target display driver 310 converts the display information and data from the display library 208 into a format compatible with the graphics display interface 156 and transmits that converted information to the graphics display interface. The graphics display interface is responsible for displaying the information on the display device 158.

When the reference display subsystem 212 is selected, the display library 208 sends display information and data to the reference display driver 312. If the reference display driver 312 can communicate with the graphics display interface 156 directly, the reference display driver converts the display information and data into a format compatible with the graphics display interface and then transmits the converted information to the graphics display interface. Alternatively (not shown), the reference display driver 312 may send the converted display information to the target display driver 310 for transmitting to the graphics display driver 156. As yet a further alternative (not shown), because it is not necessary that image data actually reach the graphics display interface 156, the reference display driver 312 may generate the image data, at least the image data that will be captured by the display library 208, but not send any information to the graphics display interface.

Figure 4:
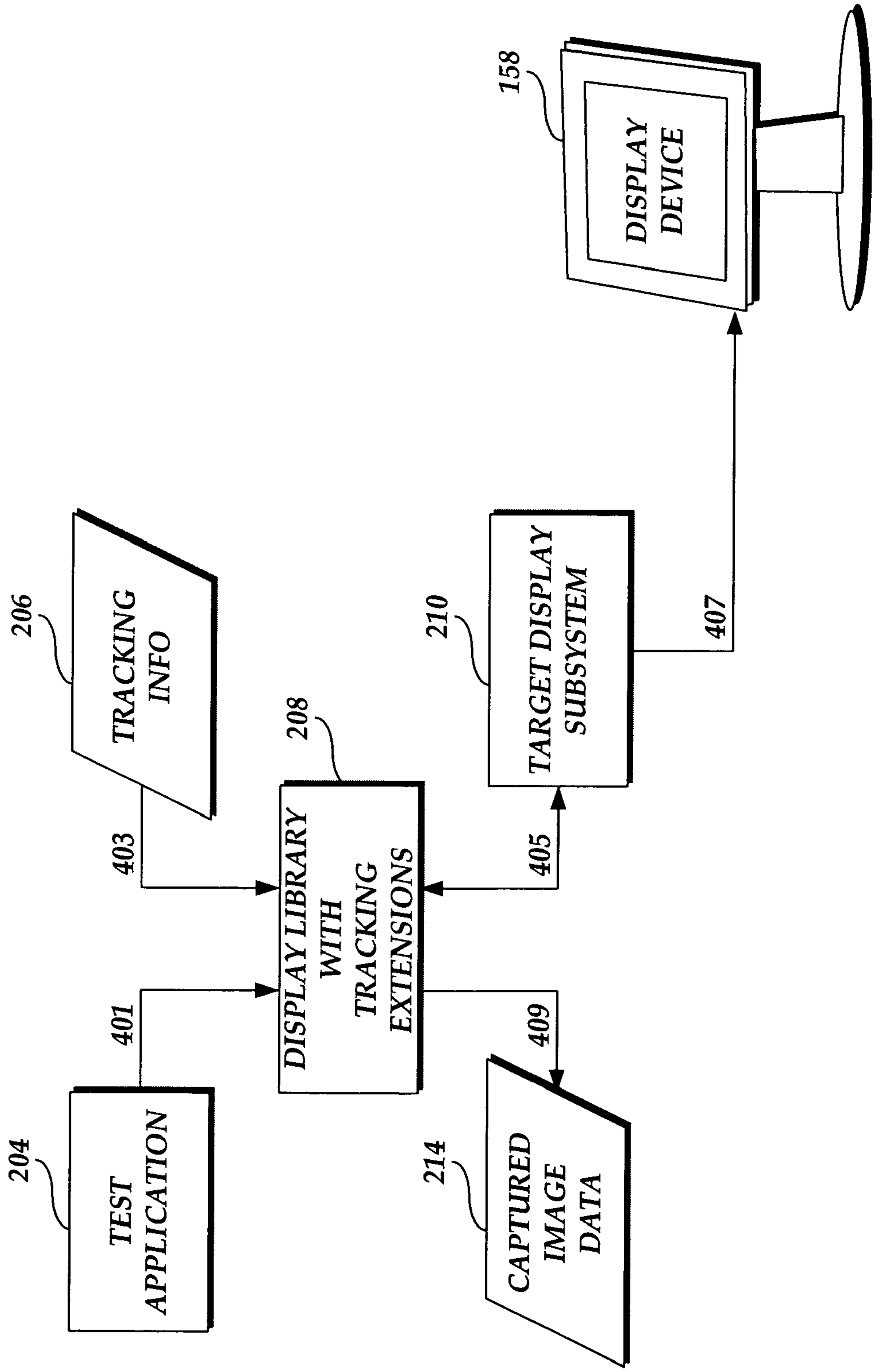
FIG. 4 is a block diagram illustrating the exemplary flow of information from a test application to a display device through a target display subsystem in a compliance test system formed in accordance with the present invention.

FIG. 4 is a block diagram illustrating the exemplary flow of information from a test application 204 to a display device 158 through the target display subsystem 210 in a compliance test system 200 (FIG. 2), formed in accordance with the present invention. This exemplary diagram illustrates a single launch/execution of the test application 204, as previously mentioned above in regard to FIG. 2. The test application 204 will, at some point during execution, attempt to display information on the display device 158. To do so, the test application 204 sends display instructions and data to the display library 208, as indicated by arrow 401.

At some point prior to sending the information to the target display subsystem 210 for the first time, the display library 208 obtains the tracking information 206 generated by the compliance test module 202 (FIG. 2), as indicated by arrow 403. According to one embodiment, obtaining the tracking information 206 occurs when the test application 204 initially requests that a display window be opened on the display device 158. From the tracking information 206, the display library 208 determines which display subsystem to select for output, which according to FIG. 4, is the target display subsystem 210. The display library 208 also initializes internal counters for tracking and recording image data with the captured image data 214, according to the predetermined intervals identified in the tracking information 206. Tracking, capturing and recording image data according to the predetermined intervals is discussed in greater detail in regard to FIG. 7. Additionally, the display library 208 may perform other initialization steps according to other data in the tracking information 206, including determining the output file for the captured image data 214.

After receiving display instructions and data from the test application 204, the display library 208 translates the instructions and data into a format suitable for the target display subsystem 210 and sends the translated instructions and data to the target display subsystem, as indicated by arrow 405.

Arrow 405 is a bi-directional arrow, indicating that information may flow in either direction between the display library 208 and the target display subsystem 210. It is important that information flows in both directions so that the display library 208 may properly track and capture the image data generated by the target display subsystem 210 for storage with the captured image data 214. Upon receiving display instructions and data from the display library 208, the target display subsystem 210 performs any necessary translations for output to the display device 158, which are sent to the display device 158, as indicated by arrow 407.

As previously mentioned, the display library 208 periodically captures image data generated by the target display subsystem 210 and records the image data with the captured image data 214, as indicated by arrow 409. This processing of information between the test application 204 and the display device 158, with the display library 208 periodically capturing and recording image data in the captured image data 214, continues until the test application terminates.

Figure 5:
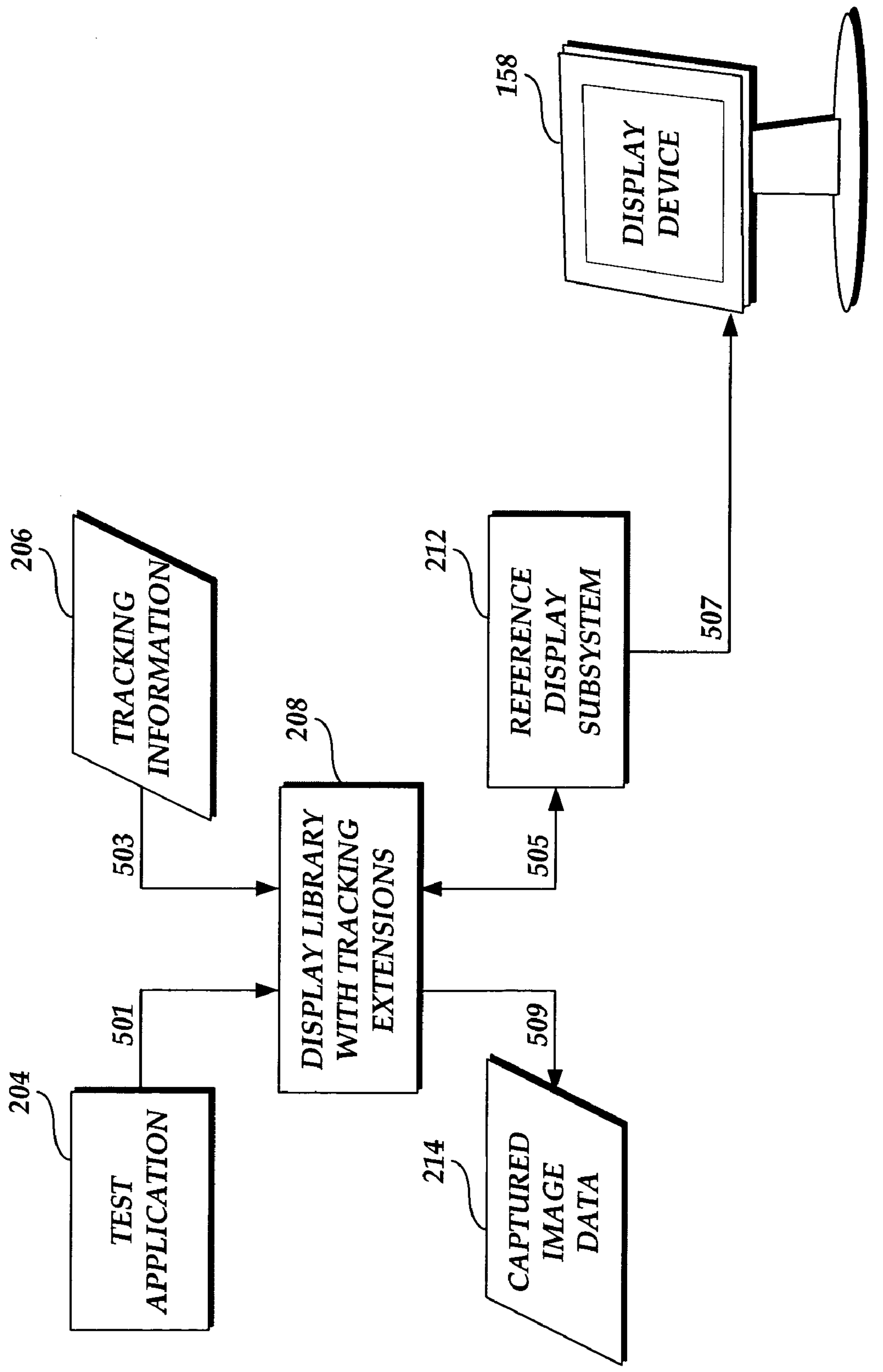
FIG. 5 is a block diagram illustrating the exemplary flow of information from a test application to a display device through a reference display subsystem in a compliance test system formed in accordance with the present invention.

FIG. 5 is a block diagram illustrating the exemplary flow of information from a test application 204 to a display device 158 through the reference display subsystem 212 in a compliance test system 200 (FIG. 2), formed in accordance with the present invention. This exemplary diagram illustrates another execution of the test application 204, as previously mentioned in regard to FIG. 2. The test application 204 will at some point in execution need to display information on the display device 158. Accordingly, the test application 204 sends the display instructions and data to the display library 208, as indicated by arrow 501.

Similar to the above description of FIG. 4, at some point prior to sending the information to a selected display subsystem for the first time, the display library 208 obtains the tracking information 206 generated by the compliance test module 202 (FIG. 2), as indicated by arrow 503. As described above, according to one embodiment, obtaining the tracking information 206 occurs when the test application 204 initially requests that a display window be opened on the display device 158. From the tracking information 206, the display library 208 determines which display subsystem to select for output, which according to FIG. 5 is the reference display subsystem 212. The display library 208 also initializes internal counters for tracking and recording image data in the captured image data 214 according to the predetermined intervals in the tracking information 206. As previously discussed, the predetermined intervals should remain the same between both executions of the test application 204. In addition, the display library 208 may perform other initialization steps according to other data in the tracking information 206, including determining the output file for the captured image data 214.

After receiving display instructions and data from the test application 204, the display library 208 translates the instructions and data into a format suitable for the reference display subsystem 212 and sends the translated instructions and data to the reference display subsystem, as indicated by arrow 505. Arrow 505 is a bi-directional arrow, indicating that information may flow in either direction between the display library 208 and the reference display subsystem 212. Upon receiving display instructions and data from the display library 208, the reference display subsystem 212 performs any necessary translations for output to the display device 158, such as rasterization of the display instructions and data, and the resultant image data is sent to the display device 158, as indicated by arrow 507. According to an alternative embodiment, the reference display subsystem 212 may not actually send the image data to the display device 158, as previously discussed.

As previously mentioned, the display library 208 periodically captures image data generated by the reference display subsystem 212 and records that image data with the captured image data 214, as indicated by arrow 509. This processing of information between the test application 204 and the display device 158, with the display library 208 periodically capturing and recording image data with the captured image data 214, continues until the test application terminates.

Figure 6:
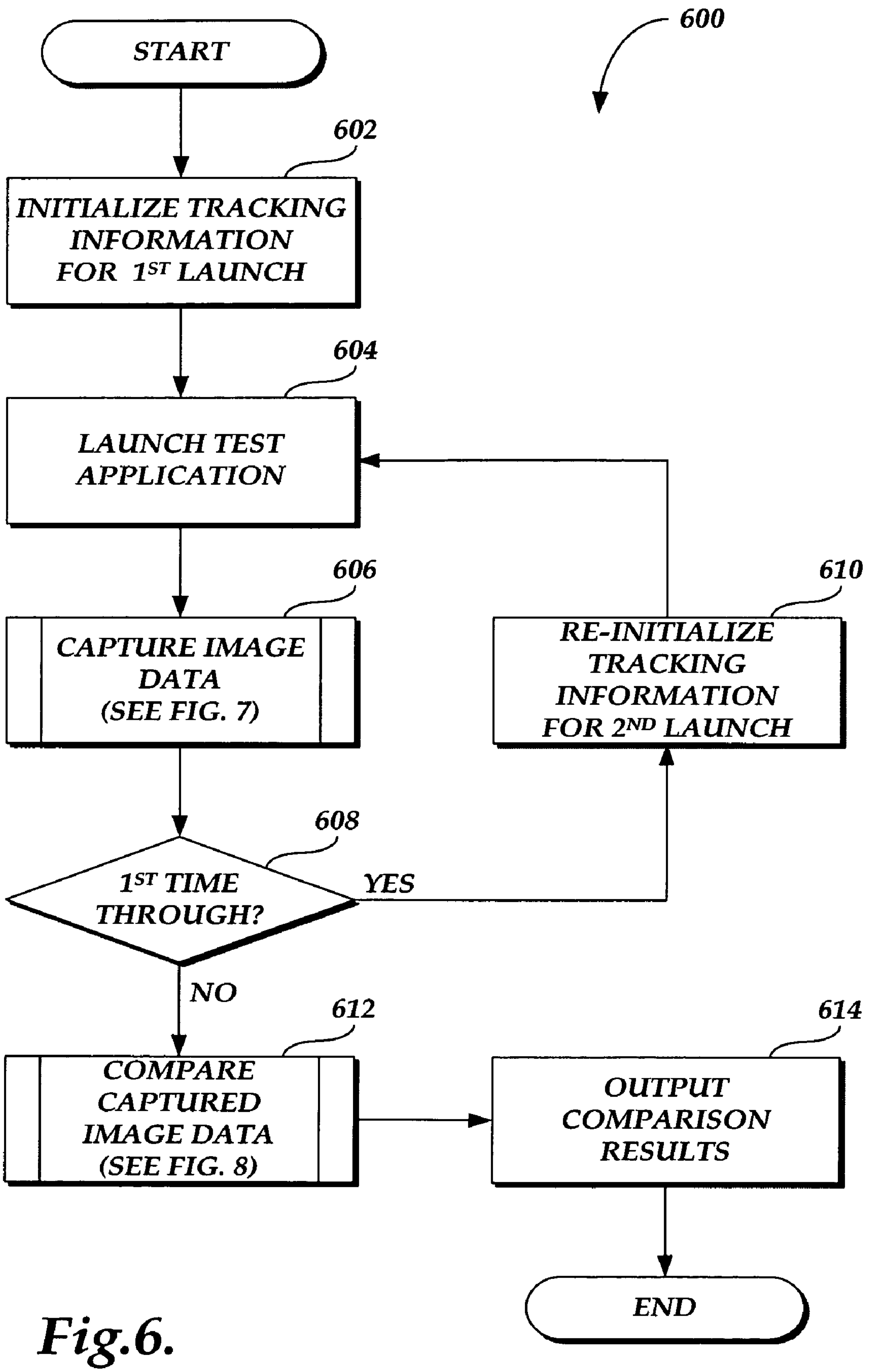
FIG. 6 is a flow diagram illustrative of an exemplary compliance test routine for determining whether a target display subsystem is compliant with a reference display subsystem formed in accordance with the present invention.

FIG. 6 is a flow diagram illustrative of an exemplary compliance test routine 600 for determining whether a target display subsystem 210 is compliant with a reference display subsystem 212 formed in accordance with the present invention. Beginning at block 602, tracking information 206 is initialized for a first execution of a test application 204. As previously described, this information will typically include an indication as to which display driver to select, either the target display subsystem 210 or the reference display subsystem 212, the predetermined intervals, as well as destination information for the captured image data 214.

After initializing the tracking information 206 for the first launch/execution of the test application 204, at block 604, the test application is launched. At block 606, as the test application 204 executes, image data generated by the selected display subsystem is tracked and recorded with the captured image data 214. A more detailed description of tracking and recording image data in the captured image data 214 is described in greater detail in regard to FIG. 7.

Figure 7:
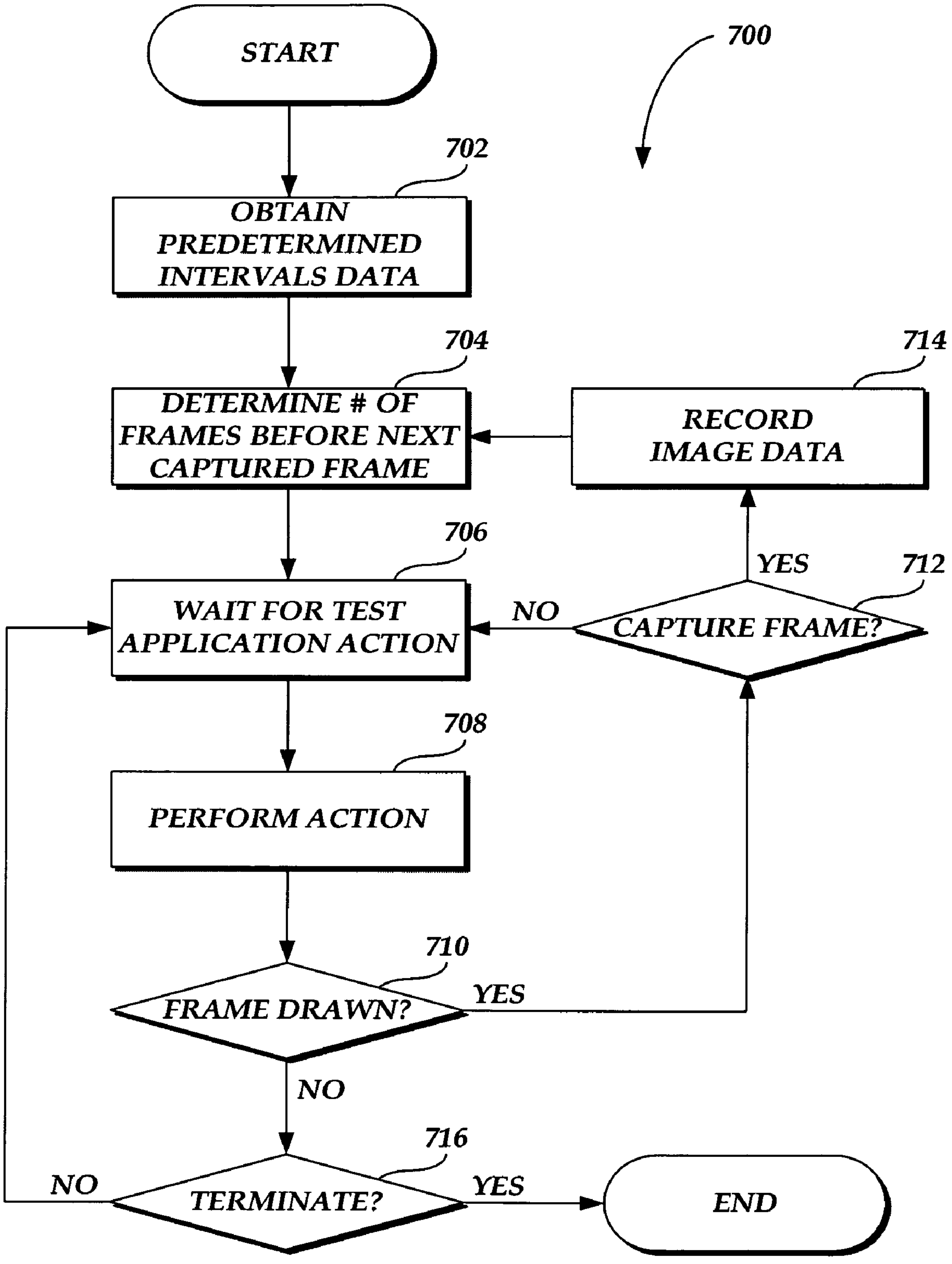
FIG. 7 is a flow diagram illustrative of an exemplary capture image data subroutine suitable for use in the compliance test routine shown in FIG. 6.

FIG. 7 is a flow diagram illustrative of an exemplary capture image data subroutine suitable for use in the compliance test routine 600 shown in FIG. 6. Beginning at block 702, the subroutine 700 obtains the predetermined intervals. According to one aspect of the invention, the predetermined intervals are stored in the tracking information 206. As previously discussed, the predetermined intervals indicate the number of frames, generated by the selected display subsystem, that are sent to the display device 158 before a frame is captured and recorded with the captured image data 214.

At block 704, a determination is made as to the number of frames to skip before capturing the next frame of image data in accordance with the predetermined intervals. At block 706, the exemplary method 700 waits for action from the test application 204. The test application 204 action may include display instructions and data, as well as notice of the test application terminating. Upon receiving some test application 204 action, at block 708, that action is performed, as necessary. At decision block 710, a determination is made as to whether the action performed caused a frame of image data to be generated and displayed on the display device 158. If the action caused a frame of image data to be generated for display on the display device 158, the process moves to decision block 712.

At decision block 712, a determination is made as to whether the frame drawn should be captured according to the determination made in block 704 as to the number of frames to skip before capturing a frame of image data. Accordingly, act decision block 712, if the recently drawn frame is not the next frame of image data to capture, the exemplary routine 700 returns to block 706 where it again awaits for test application 204 action. However, if at decision block 712, the frame is to be captured, then at block 714 the frame of image data, generated by the selected display subsystem, is obtained from the display subsystem and recorded with the captured image data 214. At block 704, a determination is again made as to the number of frames to skip before capturing the next frame of image data. Thereafter, at block 706 the exemplary routine 700 again awaits for further test application 204 action.

If, at decision block 710, a frame was not generated and displayed on the display device 158, at decision block 716, a determination is made as to whether the test application's 204 action was a termination notice. If the test application's 204 action was not a termination notice, at block 706, the exemplary routine 700 awaits for further test application 204 action. Alternatively, if, at decision block 716, the test application's 204 action was a termination notice, the exemplary capture image data routine 700 terminates.

With reference again to FIG. 6, at decision block 608, a determination is made as to whether this was the first or second launch/execution of the test application 204. If the test application 204 has been executed only one time, at block 610, the tracking information 206 is reinitialized for a second launch of the test application 204. Thereafter, the process returns to block 604 where the test application 204 is launched/executed again for the second time. However, at decision block 608, if the test application 204 has been executed twice, at block 612, the image data captured and recorded in the capture image data 216 is compared to determine whether the target display subsystem 210 is compliant with the reference display subsystem 212. An exemplary routine for comparing the captured image data is described in greater detail in regard to FIG. 8. Thereafter, at block 614, the results of the comparison performed in block 612 is output. According to one aspect of the present invention, the information is output on a monitoring device, such as display device 158. Alternatively, the resultant compliance information is output to a results file (not shown) for subsequent access and analysis. Thereafter, the exemplary routine 600 terminates.

Figure 8:
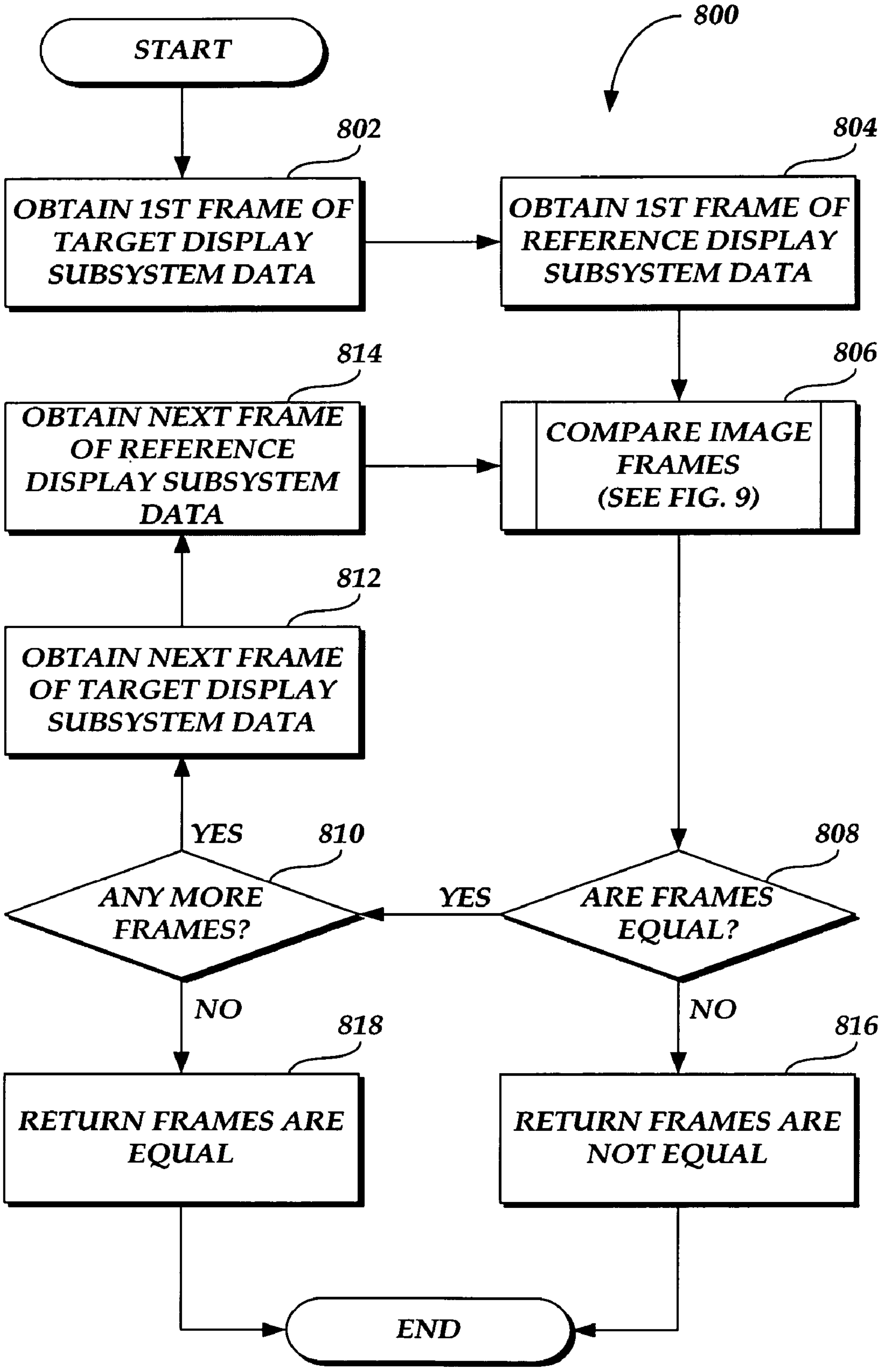
FIG. 8 is a flow diagram illustrative of an exemplary compare captured image data subroutine suitable for use in the compliance test routine shown in FIG. 6.

FIG. 8 is a flow diagram illustrative of an exemplary compare captured image data subroutine suitable for use in the compliance test routine 600 shown in FIG. 6. Beginning at block 802, the first frame of captured image data generated by the target display subsystem 210 is retrieved from the captured image data 214. At block 804, the corresponding first frame of captured image data generated by the reference display subsystem 212 is also retrieved from the captured image data 214. At block 806, the retrieved frames are compared to each other. An exemplary subroutine for comparing frames of image data is described in greater detail in regard to FIG. 9. However, one skilled in the art will recognize that there are many ways to compare frames of image data other than that described in FIG. 9. Accordingly, the exemplary subroutine presented in FIG. 9 is intended to be illustrative and not to be construed as a limitation upon the present invention.

Figure 9:
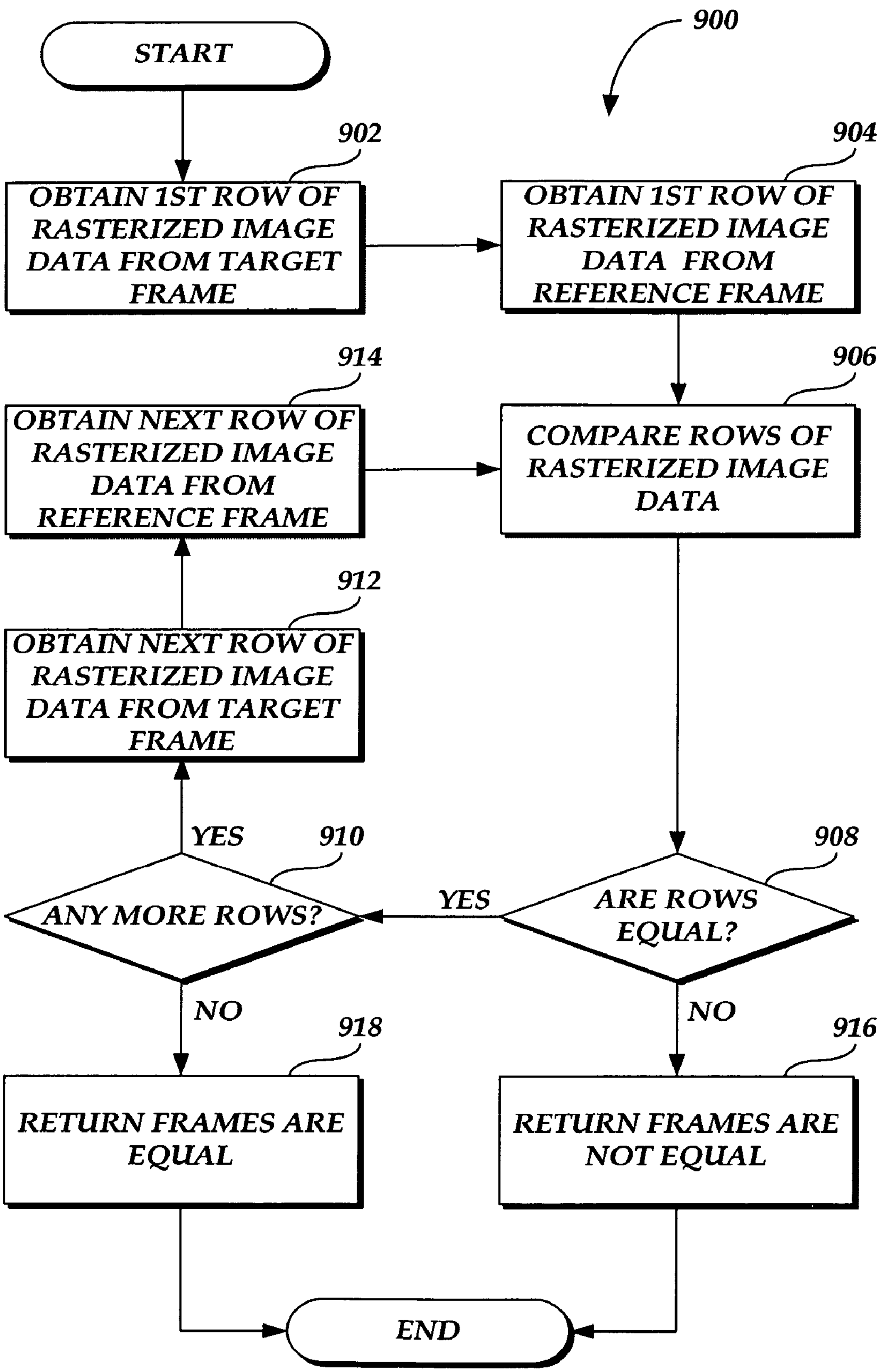
FIG. 9 is a flow diagram illustrative of an exemplary compare image frames subroutine suitable for use in the compare captured image data subroutine in FIG. 8.

FIG. 9 is a flow diagram illustrative of an exemplary compare image frames subroutine suitable for use in the compare captured image data subroutine 800 in FIG. 8. Beginning at block 902, a first row of rasterized image data is obtained from the target display subsystem's 210 frame of image data. A row of rasterized image data represents an array of image data that will be used as a scan line on a raster display device. At block 904, a corresponding first row of rasterized image data is obtained from the reference display subsystem's 212 frame of image data. At block 906, the rows of rasterized image data are compared to each other. One way to compare rows of rasterized image data is to compare corresponding values in the arrays of image data and determining whether the corresponding values are equivalent, or within an acceptable range of deviation from absolute equivalence. However, those skilled in the art will recognize that there are many other ways to compare rows of rasterized image data, many of which could tolerate acceptable deviations from absolute equality. These other comparison methods are contemplated as falling within the scope of the present invention.

At decision block 908, a determination is made as to whether the rows of rasterized image data are equivalent according to the comparison made in block 906. If it is determined that the rows of rasterized image data are equivalent, at decision block 910, a determination is made as to whether there are any additional rows of rasterized image data in the frames to compare. If there are additional rows of rasterized image data to compare, at block 912, the next row of rasterized image data generated by the target graphic display subsystem 210 is obtained. At block 914, the corresponding next row of rasterized image data generated by the reference graphic display subsystem 212 is obtained. After obtaining the next rows of rasterized image data to be compared, the exemplary subroutine 800 returns again to block 906 to compare the currently retrieved rows of rasterized image data.

Alternatively, at decision block 910, if there are no more rows of rasterized image data to be compared, at block 918, a condition is returned indicating that the corresponding frames of image data are equivalent, according to the comparison mentioned in regard to block 906. Thereafter, the compare frame data subroutine 900 terminates.

Alternatively, at decision block 908, if the rows of rasterized image data are not equivalent according to the comparison in block 906, at block 916, a condition is returned indicating that the corresponding frames of image data are not equivalent. Thereafter, the compare frame data subroutine 900 terminates.

Returning again to FIG. 8, after comparing the currently obtained frames of image data, at decision block 808, a determination is made as to whether the frames are equivalent according to the results of the comparison performed in block 806. If the frames are equivalent, at decision block 810, a determination is made as to whether there are any other frames to compare in the captured image data 214. If there are additional frames to compare, at block 812, the next frame of image data generated by the target graphic display subsystem 210 is obtained from the captured image data 214. At block 814, the corresponding next frame of image data generated by the reference graphic display subsystem 212 is obtained from the captured image data 214. The exemplary compare image data subroutine 800 then returns to block 806 to compare the currently obtained frames of image data.

Alternatively, at decision block 810, if there are no more frames of image data to be compared, at block 818, a condition is returned indicating that the frames of image data generated by the target graphic display subsystem 210 are equivalent to the frames of image data generated by the reference graphic display subsystem 212. Thereafter, the compare frame data subroutine 800 terminates.

Alternatively, at decision block 808, if the corresponding frames of image data are not equivalent, according to the comparison in block 806, at block 816, a condition is returned indicating that the frames of image data generated by the target display subsystem 210 are not equivalent to the frames of image data generated by the reference display subsystem 212. Thereafter, the compare image data subroutine 800 terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system for determining if a target display subsystem is compliant with a reference subsystem, comprising:

(a) a reference display subsystem operative within the computer system for receiving drawing instructions and generating image data suitable for display on a display device;

(b) a target display subsystem operative within the computer system for receiving drawings instructions and generating image data suitable for display on an output device; and (c) a compliance test subsystem, wherein the compliance test subsystem:

(i) generates drawing instructions;

(ii) applies said drawing instructions to either of said reference display subsystem or said target display subsystem;

(iii) stores image data generated by said either of said reference display subsystem or said target display subsystem resulting from the application of said drawing instructions to said either of said reference display subsystem or said target display subsystem;

(iv) applies said drawing instructions to the other of either said reference display subsystem or said target display subsystem;

(v) stores image data generated by the other of said either reference display subsystem or said target display subsystem resulting from the application of said image data to the other of either said reference display subsystem and said target display subsystem; and (vi) compares said stored image data generated by said reference display subsystem and by said target display subsystem to determine if said target display subsystem is compliant with said reference display subsystem.

2. The system of claim 1, wherein said compliance test subsystem includes a compliance test module, said compliance test module configured to launch a test application, wherein each launch of said test application causes the generation of said drawing instructions.

3. The system of claim 2, wherein said compliance test subsystem also includes a display library, wherein the display library:

(i) receives said drawing instructions from said test application;

(ii) selects either of said reference display subsystem or said target display subsystem to receive said drawing instructions; and (iii) applies said drawing instructions to said either selected reference display subsystem or target display subsystem.

4. The system of claim 3, wherein said display library also translates said drawing instructions into a format suitable for application to said selected reference display subsystem or target display subsystem.

5. The system of claim 4, wherein said display library obtains and stores said data generated by said selected reference display subsystem or target display subsystem on a periodic basis.

6. The system of claim 5, wherein said image data suitable for display on a display device has a frame rate and wherein said periodic basis is based on said frame rate.

7. The system of claim 2, wherein said display library selects either of said reference display subsystem or said target display subsystem to receive said drawing instructions according to selection data, and wherein when said compliance test module launches said test application a first time, said compliance test module generates said selection data indicating that said target display subsystem is to be selected to receive said drawing instructions.

8. The system of claim 7, wherein when said compliance test module launches said test application a second time, said compliance test module generates said selection data indicating that said reference display subsystem is to be selected to receive said drawing instructions.

9. The system of claim 1, wherein said compliance test subsystem stores image data in a captured image data file.

10. The system of claim 1, wherein said image data is periodically obtained from said reference display subsystem and said target display subsystem.

11. A computer-implemented method for determining whether a target display subsystem is compliant with a reference display subsystem, the method comprising each of the following performed by a computer:

selecting a first display subsystem operative on the computer for generating image data suitable for display on a display device, the first display subsystem being either a target display subsystem or a reference display subsystem;

generating drawing instructions a first time and applying the drawing instructions to the first display subsystem;

capturing and recording image data generated by the first display subsystem in response to the applied drawing instructions;

selecting a second display subsystem operative on the computer for generating image data for display on a display device, the second display subsystem being either the target display subsystem or the reference display subsystem that was not selected as the first display subsystem;

generating drawing instructions a second time and applying the drawing instructions to the second display subsystem;

capturing and recording image data generated by the second display subsystem in response to the applied drawing instructions; and comparing the captured and recorded image data generated by the first display subsystem with the captured and recorded image data generated by the second display subsystem to determine if the target display subsystem is compliant with the reference display subsystem.

12. The method of claim 11, wherein generating drawing instructions comprises executing a software application to generate the drawing instructions.

13. The method of claim 11, wherein the software application executes in a deterministic manner.

14. The method of claim 11, wherein the image data is periodically captured and recorded as the drawing instructions are applied.

15. The method of claim 11 further comprising selecting the first and second display subsystems for generating image data for display on a display device according to selection information.

16. The method of claim 11, wherein capturing and recording image data generated by the first and second display subsystems further comprises recording image data in captured image data files.

17. The method of claim 16 further comprising retrieving the image data generated by the first and second display subsystems from the captured image data files and comparing image data generated by the first display subsystem with the image data generated by the second display subsystem to determine whether the target display subsystem is compliant with the reference display subsystem.

18. The method of claim 11, wherein the image data captured and recorded from the first and second display subsystems are frames of image data.

19. The method of claim 18, wherein the frames of image data comprise frames of rasterized image data.

20. A tangible computer-readable medium having computer-executable instructions which, when executed on a computer, carry out a method comprising each of the following:

selecting a first display subsystem for generating image data suitable for display on a display device, the first display subsystem being either a target display subsystem or a reference display subsystem;

generating drawing instructions a first time and applying the drawing instructions to the first display subsystem;

capturing and recording image data generated by the first display subsystem in response to the applied drawing instructions;

selecting a second display subsystem for generating image data for display on a display device, the second display subsystem being either the target display subsystem or the reference display subsystem that was not selected as the first display subsystem;

generating drawing instructions a second time and applying the drawing instructions to the second display subsystem;

capturing and recording image data generated by the second display subsystem in response to the applied drawing instructions; and comparing the captured and recorded image data generated by the first display subsystem with the captured and recorded image data generated by the second display subsystem to determine if the target display subsystem is compliant with the reference display subsystem.

* * * * *

UNITED STATES PATENT AND TRADEMARK OFFICE

CERTIFICATE OF CORRECTION

PATENT NO. : 7,432,941 B2
APPLICATION NO. : 11/213264
DATED : October 7, 2008
INVENTOR(S) : Gershon Parent et al.

It is certified that error appears in the above-identified patent and that said Letters Patent is hereby corrected as shown below:

In column 15, line 4, in Claim 1, after “reference” insert -- display --.

Signed and Sealed this
Twenty-sixth Day of April, 2011

David J. Kappos
*Director of the United States Patent and Trademark Office*